United States Patent Office 3,372,188
Patented Mar. 5, 1968

3,372,188
SULFOXIDATION PROCESS IN THE PRESENCE OF SULFUR TRIOXIDE
Terence G. Alston, Los Angeles, and William D. Schaeffer, Pomona, Calif., assignors to Union Oil Company of California, Los Angeles, Calif., a corporation of California
No Drawing. Filed Mar. 12, 1965, Ser. No. 439,441
4 Claims. (Cl. 260—503)

ABSTRACT OF THE DISCLOSURE

The invention comprises the use of sulfur trioxide in the sulfoxidation of paraffin hydrocarbons to produce normal alkane sulfonic acids where are useful as biodegradable surfactants. The process comprises contacting a paraffin with sulfur dioxide, oxygen and sulfur trioxide at temperatures between about 20 and 100° C. and sufficient pressures to maintain liquid phase conditions. The reaction is initiated in the presence of a free radical initiator which can be ultraviolet light, peroxides or azo compounds. The sulfur trioxide functions to maintain activity of the reaction without the continuous addition of a free radical forming material thereto.

Description of the invention

This invention relates to the preparation of alkane sulfonic acids and more particularly is concerned with the preparation of alkane sulfonic acids from normal paraffins by the sulfoxidation reaction with sulfur dioxide and oxygen. The salts of the normal alkane sulfonic acids produced by neutralization are highly desirable biodegradable surface-active compounds.

Aliphatic and alicyclic sulfonic acids have been prepared from aliphatic and alicyclic hydrocarbons by the reaction therewith of sulfur dioxide and oxygen in the presence of a source of free radicals. Acetic anhydride has been used to produce a branched chain reaction which will eliminate the dependency of the reaction on a continuous source of free radical initiators. While the resulting reaction is relatively efficient in the production of alkane sulfonic acids, the acetic anhydride is converted to acetic acid which appears, as a by-product in the crude product. Since acetate salts are undesirable in surfactants, the removal of acetic acid from the crude product or the acetate salts from the neutralized product is necessary. This removal is complicated and expensive.

The primary object of this invention is the preparation of alkane sulfonic acid from normal and cyclic paraffin hydrocarbons by the sulfoxidation process.

It is another object of this invention to avoid the necessity for use of acetic anhydride in the sulfoxidation process.

It is also an object of this invention to provide a sulfoxidation process that does not continuously consume free radical initiators.

It is another object of this invention to provide a method of preparing a crude product comprising a normal alkane sulfonic acid in admixture with a detergent builder the latter being formed as by-product of the reaction.

Other objects and advantages of this invention will be apparent from the description which follows.

The foregoing described disadvantages are avoided by the practice of this invention which, briefly, comprises contacting a paraffin selected from the group consisting of normal and cyclic paraffins with sulfur dioxide and oxygen in the presence of sulfur trioxide, and initiating the sulfoxidation of the paraffin by introducing a free radical initiator into contact with the reactants. Preferably, a paraffin having between about 5 and about 25 carbon atoms is contacted with sulfur dioxide and oxygen in the presence of sulfur trioxide at a temperature between about 20° and 100° C., preferably between about 30° and 70° C. for over a period of time sufficient to produce a reaction product. Usually a product will begin to form within about ten minutes. The pressure employed can be from atmospheric to 1,600 p.s.i.g. or more and is not siginficant to the reaction. Preferably, sufficient pressure, from atmospheric to about 800 p.s.i.g. is used to maintain the reactants in liquid phase.

The normal alkane reaction product produced according to the foregoing process contains the alkane sulfonic acid and sulfuric acid; which upon neutralization with sodium hydroxide forms a highly biodegradable sodium alkyl sulfonate in admixture with sodium sulfate, a commonly used builder in detergents. The sodium sulfate by-product need not be removed from the reaction mixture since it acts as a builder in detergent compositions, and thus is a useful and desirable ingredient.

The paraffins for use in accordance with the practice of this invention include those normal and cyclic alkane paraffins having between about 5 and about 25 carbons atoms, and preferably between about 6 and about 20 atoms. Examples of suitable normal paraffin hydrocarbons are: hexane, heptane, octane, nonane, decane, undecane, dodecane, tridecane, tetradecane, pentadecane, hexadecane, heptadecane, octadecane, nonadecane, eicosane, heneicosane, docosane, tricosane, tetracosane, and pentacosane. Examples of suitable cycloparaffins are: cyclohexane, cycloheptane, etc. Preferably, to avoid spurious side reactions, the paraffin is employed free of olefins and aromatics. Additionally, branched chain paraffin hydrocarbons are likewise avoided because of non-biodegradable detergents produced therefrom. A suitable source of straight chain paraffins in sufficient purity can be obtained by contacting a paraffin stock with a molecular sieve having a uniform pore size from 5 to about 10 A. as selective adsorbents to adsorb the straight chain paraffin. The latter is thereafter recovered by desorption of the sieve in a conventional manner. Suitable separation processes involving molecular sieves of this nature are described more particularly in U.S. Patents Nos. 2,921,026, 2,935,467, and 2,938,864.

Because the monosubstituted sulfonic acids of the normal paraffin hydrocarbons are more desirable as detergents than the di- or poly-substituted acids it is preferred to operate the process to produce a maximum of monosulfonic acid. This is achieved by limiting the degree of conversion to react only a portion of the hydrocarbons, usually 10% to 50%, and preferably 15% to 30% by weight. This is achieved by limiting the contact time of the hydrocarbon with the sulfur dioxide and oxygen to between 30 minutes and 4 hours. The unreacted hydrocarbon may then be recycled to the reaction.

The reaction may be initiated by any of the well-known free radical producing compounds or procedures. Free radical initiators for use in accordance with the practice of this invention include, but need not be restricted to, the following examples: ultra violet light; gamma irradiation; peroxides, e.g., acetyl peroxide, hydrogen peroxide; metal alkyls, e.g., dimethylzinc; aliphatic diazo compounds, e.g., diazoacetic ester; inorganic azo compounds, e.g., potassium azodisulfonate; metal ketyls, e.g., sodium and potassium derivatives of benzophenone and fluorenone; N-nitroacetanilide; and hexaarylethanes, e.g., hexaphenylethane. The preferred initiator for use herein is 2,2′-azobisisobutyronitrile.

The introduction of sulfur dioxide and oxygen into contact with the hydrocarbon may be accomplished by procedures already known in the art, e.g., batch or continuous contacting. The reactants can suitably be sparged into contact with the hydrocarbon which can be maintained as a liquid pool in the reaction vessel or the hydrocarbon and gaseous reactants can be simultaneously admixed and introduced into the reactor, and product simultaneously withdrawn therefrom to provide a continuous process. The relative weight ratio of sulfur dioxide to oxygen will usually vary between 1.2:1 and 10:1, and preferably between 2:1 and 7:1. The invention is not limited to the use of pure oxygen since air and admixtures of oxygen and inert gases such as nitrogen, carbon dioxide, etc. can be used.

The relative weight ratio of sulfur trioxide to reacted paraffin may vary between 0.08 and 4.0, and preferably between about 0.2 and about 2.0. Sulfur trioxide is preferably introduced as a vapor to avoid any danger of carbonization and charring of the reaction product which may result from introduction of liquid sulfur trioxide. Introduction of the sulfur trioxide into the mixture may be accomplished by passing a substantially dry stream of sulfur dioxide and oxygen previously described over liquid sulfur trioxide, which is commercially available in its stabilized form, prior to its contacting with the hydrocarbon to thereby saturate this vapor mixture with sulfur trioxide. Alternatively, the sulfur trioxide may be independently introduced by passing a stream of nitrogen over the liquid sulfur trioxide.

The reaction temperature may vary between about 20° C. and about 100° C. It is preferred to operate the process at temperatures between 30° C. and 70° C. Attempts to operate the process at temperatures below 0° C. have not been practical because the reaction is difficult to initiate.

The following examples further illustrate a procedure for carrying out the above-described invention, but are not intended to be limiting in scope.

*Example I*

The following example illustrates a mode of operation of the invention. Into a 500-milliliter, 3-necked borosilicate glass flask fitted with a reflux condenser, an agitator, a thermometer, and a gas-inlet tube were placed 250 milliliters of normal dodecane and 0.3 gram of 2,2'-azobisisobutyrontrile. The mixture was heated in a water bath to between 70° and 80° C., and a dry gaseous mixture of 0.8 cu. ft./hr. of sulfur dioxide, 0.4 cu. ft./hr. of oxygen, and 6.6 g./hr. of sulfur trioxide was passed into the agitated mixture over a period of 15 minutes. The mixture was then cooled to 46° C. while continuing to introduce the gaseous mixture. The reaction temperature was maintained at between 44° and 52° C. for an additional 45 minutes with occasional cooling. The contacting was discontinued and 100 milliliters of water added. The mixture was again heated to 70°–75° C. for 15 minutes while sulfur dioxide and oxygen were continuously passed therethrough. The mixture was then refluxed to remove dissolved sulfur dioxide. Unreacted dodecane was removed by solvent extraction leaving a brown liquid which by analysis contained 19.8 grams of dodecyl sulfonic acid and 6.1 grams of sulfuric acid.

Similar results are obtained when eicosane ($C_{20}$) is subjected to a similar sulfoxidation reaction in the presence of sulfur trioxide and sufficient 2,2'-azobisisobutyronitrile to initiate the reaction.

*Example II*

This example illustrates another mode of operation of the invention. Into a 500-milliliter, 3-necked borosilicate glass flask fitted with a reflux condenser, an agitator, a thermometer, and a gas-inlet tube were placed 250 milliliters of cyclohexane and 4.0 grams of 2,2'-azobisisobutyronitrile. The mixture was heated in a water bath to 50–60° C. and a dry gaseous mixture of 0.8 cu. ft./hr. of sulfur dioxide, 0.4 cu. ft./hr. of oxygen, and 4.2 g./hr. of sulfur trioxide was passed into the agitated mixture at atmospheric pressure for a period of 150 minutes. The contacting was discontinued and 100 milliliters of water added. The mixture was again heated to 70°–75° C. for 15 minutes while sulfur dioxide and oxygen were continuously passed therethrough. The mixture was then steam distilled to remove dissolved sulfur dioxide and unreacted cyclohexane leaving a yellowish liquid. Upon analysis the liquid contained 20.3 grams of sulfonic acid and 8.4 grams of sulfuric acid.

*Example III*

This example illustrates an attempted sulfoxidation reaction of a normal paraffin following the procedure of Example I, however, omitting the sulfur trioxide.

Into a 500-milliliter, 3-necked borosilicate glass flask fitted with a reflux condenser, an agitator, a thermometer, and a gas-inlet tube were placed 250 milliliters of normal dodecane and 0.3 gram of 2,2'-azobisisobutyronitrile initiator. The mixture was heated in a water bath to 70° C. while a gaseous mixture of 0.8 cu. ft./hr. of sulfur dioxide and 0.4 cu. ft./hr. of oxygen was passed into the agitated mixture at atmospheric pressure for a period of 30 minutes. No reaction was observed. A further 0.5 gram quantity of 2,2'-azobisisobutyronitrile initiator was then added to the mixture while continuing to heat at 70° C. and introduce the gaseous mixture of sulfur dioxide and oxygen for an additional 20 minutes. Again, no reaction was observed and no sulfonic acid was found.

Results analogous to those indicated in the foregoing examples are obtained when other initiators and conditions within the broad purview of the above disclosure are employed. It is hence not intended to limit the invention to the details of these examples, but only broadly as defined in the following claims.

We claim as our invention:

1. In the free radical initiated sulfoxidation wherein a paraffin hydrocarbon selected from the group consisting of normal and cyclic paraffins having between about 5 and about 25 carbons is contacted with sulfur dioxide and oxygen in a reaction zone at a temperature between about 20° and 100° C. and sufficient pressure to maintain liquid phase conditions and wherein said sulfoxidation is initiated by introduction into said reaction zone of free radicals, the improvement which comprises introducing sulfur trioxide in an amount comprising between 0.08 and 4.0 parts by weight per weight part of said hydrocarbon into said reaction zone to contact with said hydrocarbon, sulfur dioxide and oxygen.

2. In the process of claim 1 wherein the sulfur trioxide is introduced as a vapor.

3. In the process of claim 2 wherein the weight ratio of sulfur trioxide to reacted hydrocarbon is between about 0.2 and about 2.0.

4. In the process of claim 2 wherein the paraffin hydrocarbon contains between about 6 and about 20 carbon atoms.

References Cited

UNITED STATES PATENTS 2,503,280    4/1950    Lockwood _____ 260—513

OTHER REFERENCES

Orthner: Angew Chem., 62 (1950), 302–5.

Groggins: Unit Processes in Organic Synthesis fourth edition, 1952 (New York), page 285.

LORRAINE A. WEINBERGER, *Primary Examiner.*

M. WEBSTER, *Assistant Examiner.*